Nov. 19, 1935.     D. L. McNEAL     2,021,799
ELECTROPNEUMATIC BRAKE
Filed April 4, 1934     3 Sheets-Sheet 2
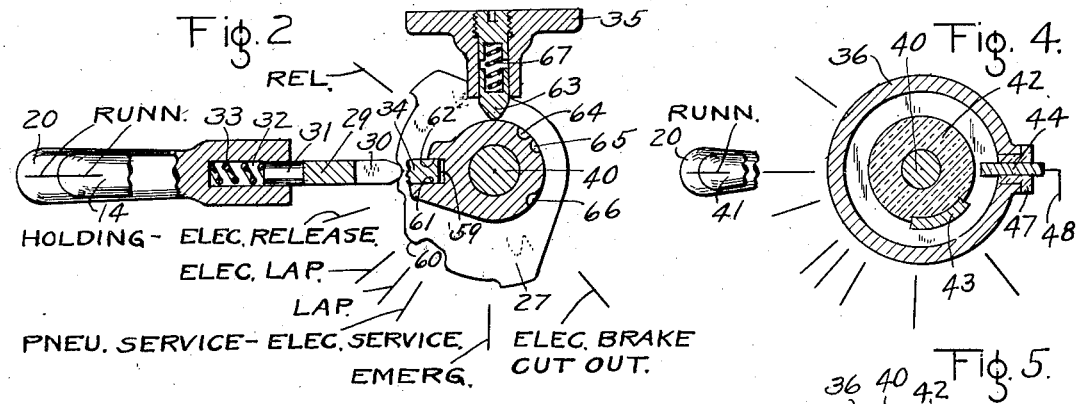
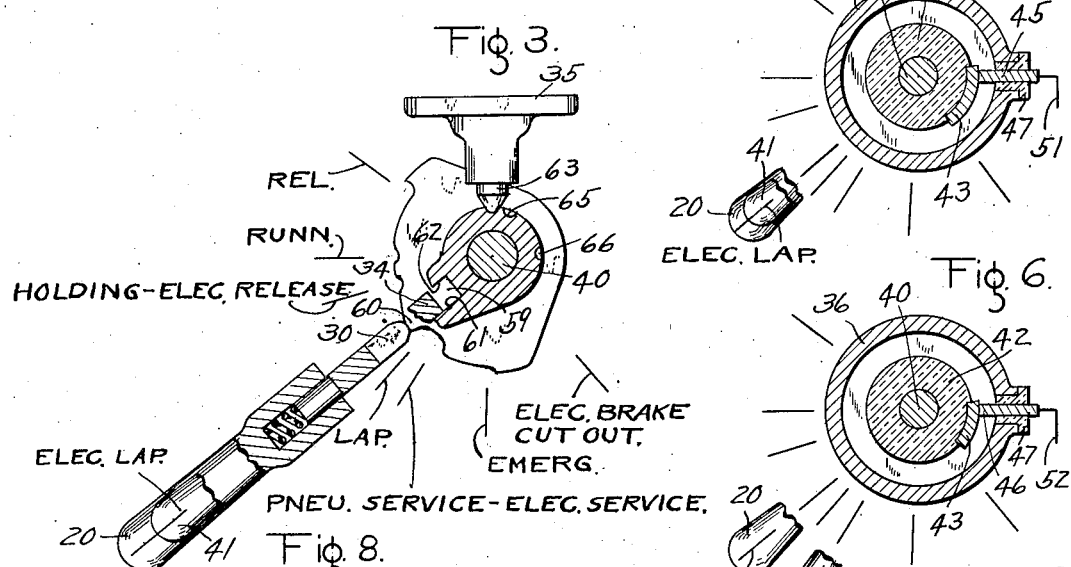
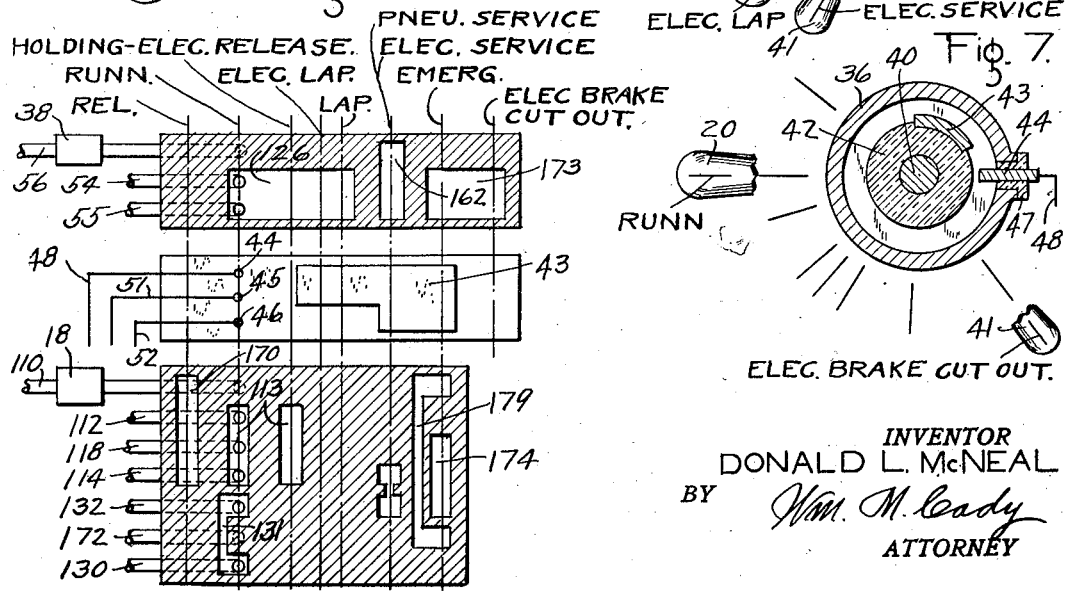
*INVENTOR*
DONALD L. McNEAL
BY *Wm. M. Cady*
*ATTORNEY*

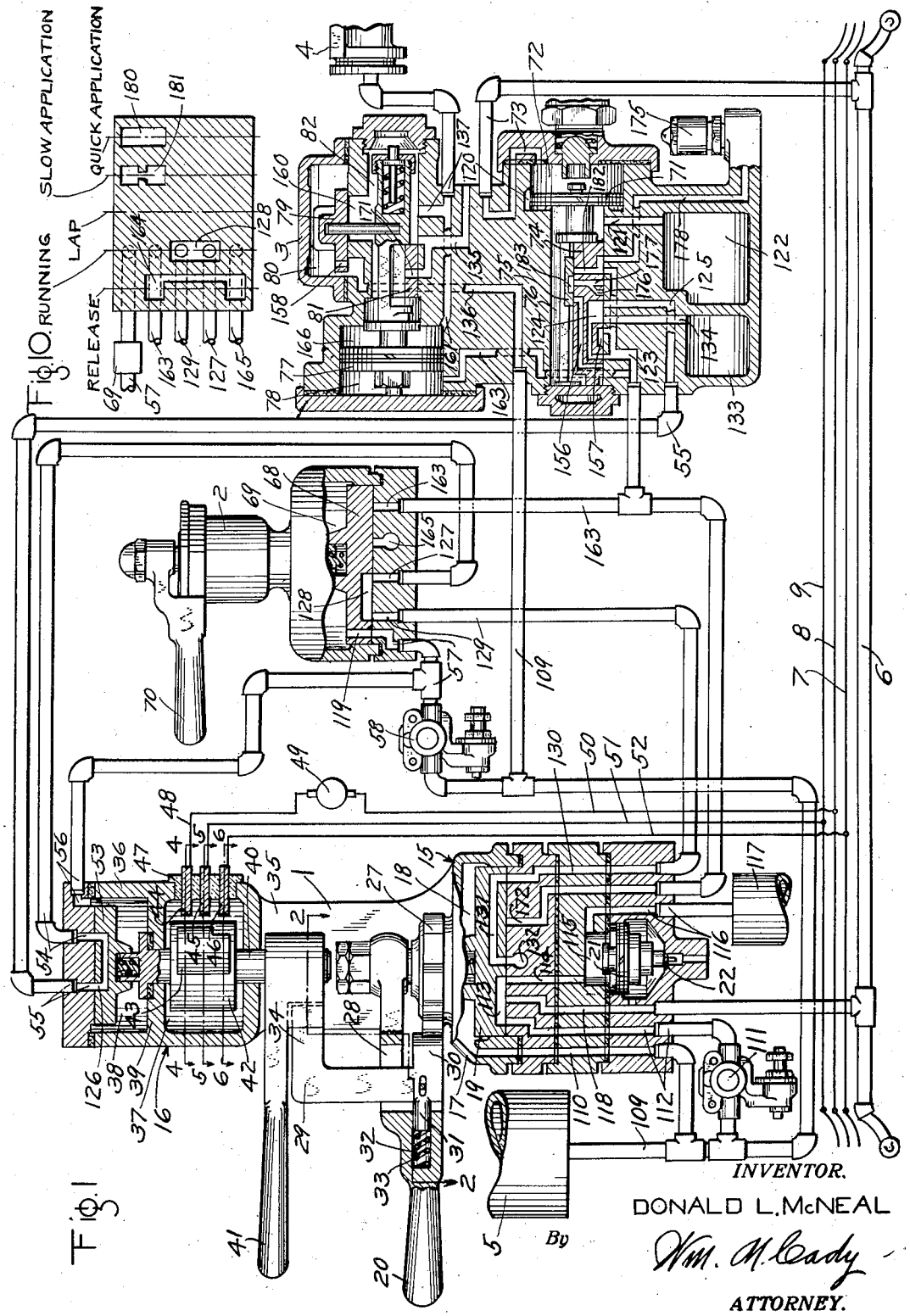

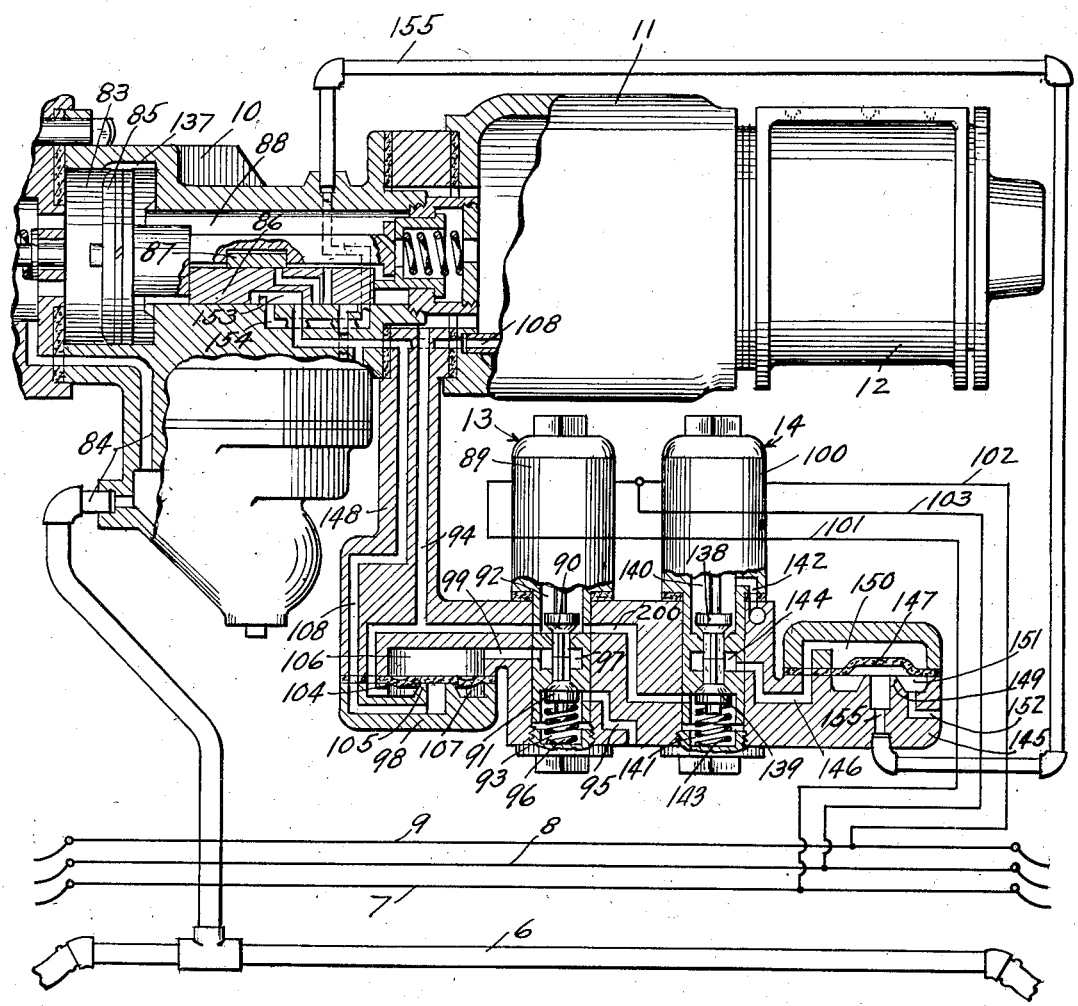

Patented Nov. 19, 1935

2,021,799

UNITED STATES PATENT OFFICE 2,021,799

ELECTROPNEUMATIC BRAKE

Donald L. McNeal, Wilkinsburg, Pa., assignor to The Westinghouse Air Brake Company, Wilmerding, Pa., a corporation of Pennsylvania Application April 4, 1934, Serial No. 718,961

14 Claims. (Cl. 303—15)

This invention relates to electro-pneumatic brakes and has for its principal object the provision of an improved combined automatic brake valve device and electric brake switch device for controlling the brakes on the locomotive and cars of a train.

Another object is to provide an improved combined automatic brake valve device and electric brake switch device for controlling the brakes on the cars of a train either pneumatically or electrically and for controlling the locomotive brakes pneumatically, said devices being so interlocked that when the electric brake switch device is operated to effect an application of the brakes, the brake valve device is automatically operated to lap position so as to cut off the supply of fluid under pressure to the brake pipe, and when the electric brake switch device is operated to effect a release of the brakes, the brake valve device is automatically returned to running or release position, as may be desired.

Other objects and advantages will appear in the following more detailed description of the invention.

In the accompanying drawings: Fig. 1 is a diagrammatic view, mainly in section, of a fluid pressure brake equipment for a locomotive, embodying my invention; Fig. 2 is a sectional view taken on the line 2—2 of Fig. 1 and illustrates the mechanical interlock arrangement between the handles of the automatic brake valve device and the brake switch device in running position of the handles of said devices; Fig. 3 is a sectional view similar to Fig. 2 but showing the handles of the automatic brake valve device and of the brake switch device in electric lap position; Figs. 4, 5 and 6 are sectional views taken on the lines 4—4, 5—5 and 6—6, respectively, of Fig. 1, with the operating handles of the combined automatic brake valve and brake switch device in various operating positions; Fig. 7 is a sectional view similar to Fig. 4 and shows the operating handle of the brake switch device in the position in which it is carried when controlling the brakes pneumatically; Fig. 8 is a development view of the combined automatic brake valve and brake switch device and illustrates diagrammatically the various communications and electrical contacts made in the various positions of said device; Fig. 9 is a diagrammatic view, partly in section, of an electro-pneumatic brake equipment for a car; and Fig. 10 is a development view of the independent brake valve device and shows diagrammatically the various communications established in the various operating positions of said device.

As shown in Fig. 1, the locomotive brake equipment comprises a combined automatic brake valve and brake switch device 1, and the usual independent brake valve device 2, distributing valve device 3, brake cylinder 4, main reservoir 5, and brake pipe 6. The locomotive equipment may further comprise the train wires 7, 8 and 9, which wires will hereinafter be termed application wire, return wire, and release wire, respectively.

The electro-pneumatic brake equipment on the cars may include a triple valve device 10, an auxiliary reservoir 11, a brake cylinder 12, an application magnet valve device 13 and a release magnet valve device 14, both of said magnet valve devices being carried by a pipe bracket 148 which is clamped between the triple valve device and auxiliary reservoir, and the train wires 7, 8 and 9, this equipment being similar to that disclosed in the pending application of Clyde C. Farmer, Serial No. 507,783, filed January 10, 1931. It should be understood, however, that this type of electro-pneumatic brake equipment is shown herein merely for the purpose of illustration and that the invention is not limited to use with this particular type of electro-pneumatic brake equipment.

The combined automatic brake valve and brake switch device 1 comprises a brake valve portion 15 and a brake switch portion 16. The brake valve portion is similar to the usual well known automatic brake valve device and comprises a casing 17 carrying a quadrant 27 and having a chamber 18 containing a rotary valve 19 adapted to be operated by a handle 20, an equalizing piston 21 and an exhaust valve 22 adapted to be operated by said piston. The handle 20 is provided with a longitudinal slot 28 extending vertically therethrough in which is mounted a movable member 29 adapted to slide in said slot longitudinally relative to said handle. The member 29 is extended inwardly at the lower end to form a latch 30 which is adapted to engage the usual notches in the quadrant 27 shown in Figs. 2 and 3, for defining the different operating positions of the brake valve handle 20, which are the usual release, running, holding, lap, service and emergency positions. The member 29 has formed thereon a projection 31 which may be slidably guided in a bore 32 in said handle. In the bore 32 is a coil spring 33 which engages the projection 31 and presses the latch 30 into engagement with the quadrant 27. The member 29 is provided at its upper end with an inwardly extending arm 34, for a purpose which will presently appear.

Extending upwardly from the casing 17 is a web 35 for supporting the brake switch portion 16, which portion may comprise a casing 36 having chambers 37 and 38 separated from each other by a partition wall 39. Extending into chamber 37 and through the partition wall 39 into chamber 38 is a rotatable shaft 40 adapted to be turned by means of a handle 41. Carried by said shaft in chamber 37 and electrically insulated therefrom by a sleeve or drum 42 is a contact 43 which moves with the drum and at various times is adapted to engage contact fingers 44, 45 and 46. The contact fingers 44, 45 and 46 are carried in the casing wall, said fingers being properly insulated from the casing and from each other in any suitable manner, such as by means of an insulating insert 47. The contact 44 may be connected by a wire 48 to a source of electric current, such as a generator 49, the other terminal of said generator being connected by a wire 50 to the return wire 8. The contact 45 is connected by a wire 51 to the release wire 9 and the contact 46 is connected by a wire 52 to the application wire 7. A development of the drum with the electrical contacts established is shown in Fig. 8.

Contained in chamber 38 is a rotary valve 53 operatively connected to the shaft 40 and adapted to control a passage 55 connected by pipe 55 to the usual distributing valve release pipe connection of the distributing valve device 3, and is also adapted to control a passage 54 connected by pipe 54 to the usual distributing valve release pipe connection of the independent brake valve device 2. Thus, it will be observed that the rotary valve 53 is interposed between the pipes 54 and 55, which pipes will hereinafter be termed release pipe, and application and release pipe, respectively. The rotary valve chamber 38 is connected through a passage and pipe 56 to the usual reducing valve pipe 57 at a point intermediate the reducing valve 58 and the independent brake valve device 2.

The socket portion of the handle 41 is provided with a recess 59, as shown in Figs. 2 and 3, which is adapted to slidably receive, between the side faces 60 and 61 thereof, the free end of the arm 34 of the member 29 for effecting driving engagement between the handle 41 and the handle 20, so that movement of the handle 41 through a certain zone will effect movement of the handle 20.

It will be understood that as the handle 20 is turned, the latch 30 on the member 29 is shifted inwardly and outwardly, in the usual manner, according to the contour of the latch engaging surface of the quadrant 27, and thus effects corresponding movement of the arm 34. The contour of the quadrant within the zone defined by release and holding positions of the automatic brake valve device is such that the arm 34 will remain in engagement within the recess 59 when the handle 41 is moved within said zone and, due to this engagement, the handle 20 will be moved concurrently in the same direction as the handle 41 is moved. Between the notches defining holding and lap positions of the automatic brake valve device, the latch engaging surface of the quadrant 27 is inclined outwardly from the holding position notch to the landing adjacent to the lap position notch, so that when the brake switch handle 41 is moved in a counter-clockwise direction from holding position, the latch 30, and consequently the arm 34, will be moved outwardly while said latch is sliding over said inclined surface, and the landing 60 is so spaced from the axis of the shaft 40 that when the latch has been moved into engagement with said landing, the arm 34 will have been entirely withdrawn from within the recess 59, as shown in Fig. 3. The position of the handles 20 and 41 in which this disengagement of the arm 34 from within the recess 59 occurs will be termed hereinafter electric lap position.

Thus, the handle 20 moves with the handle 41 during movement of the handle 41 in a counter-clockwise direction from holding position until the handles are in electric lap position, and the disengagement of the arm 34 from within the recess 59 in electric lap position permits the handle 41 to be moved therefrom in a counter-clockwise direction to the extreme limit of its travel, which is defined as electric brake cut-out position and will be described hereinafter, free from the handle 41, the handle 20 meanwhile being left in electric lap position. It will be noted that electric lap position is slightly to the rear of lap position of the automatic brake valve portion, that is, between lap and holding positions. As is well known, lap position of the usual automatic brake valve device actually embraces a certain zone at either side of the lap position notch. Electric lap position is so disposed that the automatic brake valve portion will be positioned in the lap zone between holding and lap positions when the handle 20 is moved to and left in electric lap position, as above described.

It will be noted that the face 61 of the recess 59 extends farther outwardly than the face 62 and is adapted to engage the arm 34 upon movement of handle 41 of the brake switch device in a clockwise direction from any position and to remain in engagement therewith throughout the range of such movement. Thus when the handle 41 of the brake switch device is moved in a clockwise direction from electric lap position, the face 61 will engage the arm 34 and cause the handle 20 of the automatic brake valve device to be moved concurrently in the same direction. During this movement of the handle 20, the latch 30 will slide down the inclined surface on the quadrant between lap and holding positions and thereby cause the arm 34 to again engage within the recess 59. Thus, the handles 20 and 41 are again interlocked so that they will move together upon movement of the handle 41 in a counter-clockwise direction within the zone included between release and electric lap positions.

Due to the fact that the face 61 of the recess 59 is adapted to engage the arm 34, as above explained, movement of the handle 20 of the automatic brake valve device from any position to emergency position causes the handle 41 of the brake switch device to be moved therewith, for a purpose which will be understood from the description hereinafter.

Carried by the supporting web 35 is a latch 63, as shown in Fig. 2, which is adapted to engage, at different times, the notches 64, 65 and 66 for defining electric lap, electric service and electric brake cut-out positions, respectively, the latch 63 being acted upon by a spring 67 for effecting said engagement. Electric release position is coincident with holding position of the automatic brake valve device, the engagement of the latch 30 with the holding notch defining said electric release position, it being remembered that the handles 20 and 41 are interlocked in said holding position, as hereinbefore described.

The independent brake valve device 2 is of the usual type employed in the well known "E T" locomotive brake equipment by which the locomotive brake may be controlled independently of the train brakes and comprises a rotary valve 68 contained in a chamber 69 and adapted to be operated by a handle 70.

The distributing valve device 3 comprises the usual equalizing portion and application portion. The equalizing portion comprises a piston 71 contained in a chamber 72 which is connected through passage 73 to the brake pipe 6, and a main slide valve 74 and an auxiliary slide valve 75 contained in a valve chamber 76 and adapted to be operated by said piston.

The application portion of the distributing valve device 3 comprises a piston 77 contained in a chamber 78, an application slide valve 79 contained in a chamber 80 and an exhaust slide valve 81 contained in a chamber 82, said slide valves being adapted to be operated by the piston 77.

The triple valve device, as shown in Fig. 9, may be of the usual type comprising a casing having a chamber 83 connected to the brake pipe 6 through a passage and pipe 84 in the usual manner and containing a piston 85 adapted to operate the usual main slide valve 86 and auxiliary slide valve 87 contained in a chamber 88 connected to the auxiliary reservoir 11.

The application magnet valve device 13 may comprise a magnet 89 adapted to control oppositely seating valves 90 and 91 contained in chambers 92 and 93, respectively, the chamber 92 being connected to the auxiliary reservoir 11 through a passage 94 and the chamber 93 being open to the atmosphere through a passage 95. Also contained in the chamber 93 is a spring 96, the pressure of which tends to seat the valve 91 and to unseat the valve 90. Intermediate the valves 90 and 91 there is a chamber 97 which leads to an application valve device 98 through a passage 99.

The release magnet valve device may comprise a magnet 100 adapted to control oppositely seating valves 138 and 139 contained in chambers 140 and 141, respectively, the chamber 140 being open to the atmosphere through a passage 142 and the chamber 141 being connected to the valve chamber 92 of the magnet valve device 13 through a passage 200. Also contained in the chamber 141 is a spring 143, the pressure of which tends to seat the valve 139 and to unseat the valve 138. Intermediate the valves 138 and 139 there is a chamber 144 which leads to a release valve device 145 through a passage 146.

One terminal of the magnet 89 is connected to the application wire 7 by a wire 101 and one terminal of the release magnet 100 is connected to the release 9 by a wire 102, while each of the other terminals of the magnets is connected to the return wire 8 by a wire 103.

The application valve device 98 may comprise a flexible diaphragm 104 which is adapted to seat on an annular seat rib 105. A chamber 106 at one side of the diaphragm valve is connected to the chamber 97 of the magnet valve device 13 through the passage 99 and a chamber 107 at the other side is open to the passage 94. Leading from the inner seated area of the diaphragm valve is a brake cylinder passage 108.

The release valve device 145 may comprise a flexible diaphragm valve 147 which is mounted in the bracket 148 and is adapted to seat on an annular seat rib 149. A chamber 150 at one side of the diaphragm valve is connected to the chamber 144 of the magnet valve device 13 through the passage 146 and a chamber 151 at the other side is open to the atmosphere through a passage 152.

When each car in a train is provided with an electro-pneumatic brake equipment of the type described hereinbefore and the electric controlling circuit is complete from the locomotive throughout the train, the train brakes will usually be controlled electrically, in the manner described hereinafter. A train may, however, be made up of mixed brake equipments, that is, some cars will have an electro-pneumatic brake equipment and other cars will have the usual type of pneumatically controlled brake equipment (not shown). Whether such a train is to be controlled electrically pneumatically will depend upon the number of cars therein provided with an electro-pneumatic brake equipment and their distribution in the train.

In operation, assuming that the train brakes are to be controlled electrically, the brake switch device 16 is placed in running position and this automatically positions the brake valve device 15 in running position, as shown in Fig. 2, due to the interlocking of the respective handles 41 and 20 in the manner hereinbefore described. The independent brake valve device 2 is also placed in running position.

With the brake switch device 16 in running position, the contact 43 is out of engagement with the contacts 44, 45 and 46, as shown in Fig. 1, and the train wires 7, 8 and 9 are therefore de-energized.

Fluid under pressure from the main reservoir 5 flows through pipe 109 and passage 110 to the rotary valve chamber 18 of the automatic brake valve device 15, through pipe 109 to the feed valve device 111 and to the reducing valve 58, and through pipe 109 and passage 136 to the application slide valve chamber 80 of the distributing valve device 3.

The feed valve device 111 operates in the usual manner to reduce the pressure of the fluid from the main reservoir 5 to that normally carried in the brake pipe. Fluid at this reduced pressure flows from the feed valve device 111 through pipe and passage 112 to the seat of the rotary valve 19 in the automatic brake valve device 15.

With the rotary valve 19 of the automatic brake valve device 15 in running position, as shown in Fig. 1, fluid at the reduced pressure supplied from the feed valve device 111 flows from passage 112 through cavity 113 in the rotary valve and passage 114 to chamber 115 at the upper side of the equalizing piston 21 and from thence through passage and pipe 116 to an equalizing reservoir 117. Fluid at the reduced pressure supplied by the feed valve device 111 also flows from cavity 113 in the rotary valve 19 through passage 118 to the lower side of the equalizing piston. The fluid pressures thus become balanced on the opposite sides of the equalizing piston 21 and said piston operates to maintain seated the discharge valve 22. Fluid under pressure supplied to passage 118 also flows to the brake pipe 6, charging said brake pipe with fluid at feed valve pressure.

The reducing valve 58 operates in the usual manner to supply fluid at reduced pressure to pipe and passage 57 leading through port 119 in the rotary valve 68 of the independent brake valve device 2 to chamber 69. Fluid at reducing valve pressure supplied to pipe 57 also flows through pipe and passage 56 to the rotary valve chamber 38 of the brake switch device 16.

Fluid under pressure supplied to the brake pipe 75

6 flows through passage 73 to the equalizing piston chamber 72 of the distributing valve device 3 and causes the equalizing piston 71 to shift the slide valves 74 and 75 to their release positions, as shown in Fig. 1, in which position a feed groove 120 is uncovered, thereby permitting fluid under pressure to flow from the piston chamber 72 to the valve chamber 76 and from thence through passage 121 to a pressure chamber 122.

With the equalizing slide valve 74 of the distributing valve device in release position, the application piston chamber 78 is connected to the atmosphere through passages 163 and 123, cavity 124 in the equalizing slide valve 74, passage 125, application and release pipe and passage 55, cavity 126 in the rotary valve 53 of the brake switch device 16, release passage and pipe 54, passage 127 in the independent brake valve device 2, cavity 128 in the rotary valve 68, passage and pipe 129, passage 130 in the automatic brake valve device 15, cavity 131 in the rotary valve 19 and an atmospheric passage 132. The application chamber 133 is also connected to passage 125 through passage 134 and cavity 124 in the slide valve 74 and is therefore normally at atmospheric pressure.

The application piston chamber 78 being at atmospheric pressure, the application piston 77 and slide valves 79 and 81 assume the positions shown in Fig. 1, in which the valve chamber 82 is connected to the atmosphere, through port 171 in the exhaust valve 81 and the passage 136. The brake cylinder 4 is connected to chamber 82 by pipe and passage 137 and is therefore normally at atmospheric pressure.

Fluid under pressure supplied to the brake pipe flows therefrom to the piston chamber 83 of the triple valve device 10 of each car equipment through pipe and passage 84, and with the triple valve parts in release position, as shown in Fig. 1, fluid under pressure flows from the piston chamber 83 to the auxiliary reservoir 11 through the usual feed groove 137 around the triple valve piston 85 and valve chamber 88.

Fluid under pressure supplied to the brake pipe also flows to the triple valve devices (not shown) on cars not having an electro-pneumatic brake equipment, and with the triple valve parts in release position, charges the auxiliary reservoir in the usual manner.

With the train wires 7, 8 and 9 deenergized, as hereinbefore mentioned, the wires 101, 103 and 102 and the magnets 89 and 100 are deenergized. With the magnet 89 deenergized, the valve 90 is unseated and the valve 91 is seated, due to the action of spring 96, as shown in Fig. 9, and with the magnet 100 deenergized, the valve 138 is unseated and the valve 139 is seated, due to the action of the spring 143.

Fluid under pressure supplied to the valve chamber 88 in the triple valve device and to the auxiliary reservoir 11 flows to the diaphragm chamber 106 in the application valve device through passage 94, valve chamber 92 in the magnet valve device 13, past the unseated valve 90, through chamber 97 and passage 99. From the chamber 92 fluid under pressure flows to the valve chamber 141 in the magnet valve device 14 through passage 200. Fluid under pressure also flows from passage 94 to the chamber 107. With the triple valve device in release position, the passage 108 which leads from the inner seated area of the flexible diaphragm valve 104 and from the brake cylinder 12 is connected to the atmosphere through a cavity 153 in the main slide valve 86 of the triple valve device, passage 154, pipe and passage 155, chamber 151 and passage 152. Since the inner seated area of the diaphragm 104 is connected to the atmosphere, as just described, the pressure of fluid in chamber 106 will maintain the diaphragm valve 104 seated against the opposing pressure of fluid in the chamber 107, so that there will be no loss of fluid past this valve from the auxiliary reservoir to the atmosphere.

To effect an application of the brakes electrically, the handle 41 of the brake switch device 16 is moved to electric service position, shown in Fig. 6. Due to the interlocking arrangement hereinbefore described, between the handles 41 and 20, the handle 20 moves with the handle 41 to electric lap position where it remains while the handle 41 is moved to electric service position. As hereinbefore explained, electric lap position of the automatic brake valve device is a position in which said device is lapped, and with the brake valve device thus lapped, the supply of fluid at feed valve pressure to the brake pipe is cut off, in the usual manner.

In electric service position of the brake switch device, the contact 43 engages the contacts 44, 45 and 46, thus connecting the wire 48 to both the wires 51 and 52. With contact 43 engaging contacts 44 and 46, current is supplied from the generator 49, or other source of current, to the application magnet 89 through a circuit which includes wire 48, contacts 44, 43 and 46, wires 52, 7 and 101, the application magnet 89, wire 103, return wire 8 and wire 50. With contact 43 engaging contacts 44 and 45, current is supplied from the generator 49 to the release magnet through a circuit which includes wire 48, contacts 44, 43 and 45, wire 51, release wire 9, wire 102, release magnet 100, wire 103, return wire 8 and wire 50. Thus, both the application and release magnets are energized.

With the release magnet 89 energized, the valve 138 is seated and the valve 139 unseated. With the valve 139 unseated, fluid under pressure from the valve chamber 141, as supplied from the auxiliary reservoir, flows to the chamber 150 in the release valve device 145 past the unseated valve 139, through chamber 144 and passage 146, causing the diaphragm valve 147 to flex downwardly into seating engagement with the annular seat rib 149, thus closing communication from the brake cylinder 12 to the atmosphere.

The energization of the application magnet 100 causes the valve 90 to be seated and the valve 91 to be unseated. With the valve 90 seated, communication is closed from the auxiliary reservoir to the chamber 106 in the application valve device 98. With the valve 91 unseated, fluid under pressure is vented from the chamber 106 to the atmosphere through passage 99, chamber 97, past the unseated valve 91, through valve chamber 93 and passage 95. With the chamber 106 thus vented, the pressure of fluid in the chamber 107 as supplied from the auxiliary reservoir and acting on the under side of the diaphragm valve 104 causes said valve to flex upwardly from the seat rib 105, so that fluid under pressure now flows from the auxiliary reservoir 11 to the brake cylinder 12 through passage 94, valve chamber 107 and passage 108. Now, since the release valve 147 is seated so that fluid under pressure supplied to the brake cylinder passage 108 cannot escape to the atmosphere, an application of the brakes is effected.

If it should be desired to limit the brake cylinder pressure in effecting an application of the brakes, the operator first moves the brake switch device 16 to electric service position, which causes the car brake equipments to operate the supply fluid under pressure to the brake cylinders in the same manner as just described and then when the desired brake cylinder pressure is obtained moves the handle 41 of the brake switch device to electric lap position, shown in Figs. 3 and 5. This movement of the handle 41 causes the contact 43 in the brake switch device to become disengaged from the contact 46, thereby opening the circuit through the application magnet 89. The contact 43 remains in contact with contacts 44 and 45, thereby maintaining the circuit through the release magnet 100 closed.

Upon the opening of the circuit through the magnet 89, said magnet is deenergized and the pressure of the spring 96 causes the valve 91 to be seated and the valve 90 to be unseated. With the valve 91 unseated, communication from the chamber 106 in the application valve device 98 to the atmosphere is closed off, and with the valve 90 unseated, fluid under pressure from passage 94 again flows to the chamber 106 and causes the diaphragm valve 104 to flex downwardly into seating engagement with the seat ring 105, thus closing off further flow of fluid from the auxiliary reservoir to the brake cylinder.

It will here be understood that when the brakes are controlled electrically, the triple valve device 10 does not move from its release position.

In effecting an application of the brakes in the manner above described, the flow of fluid under pressure from the auxiliary reservoir to the brake cylinder effects a reduction in pressure in the auxiliary reservoir and in the valve chamber 88 below that in the piston chamber 83 of the triple valve device 10, with the result that fluid under pressure flows from said piston chamber through the feed groove 137 into chamber 88 and the auxiliary reservoir. The automatic brake valve device being in electric lap position, as hereinbefore explained, the flow of fluid under pressure from the piston chamber 83 into the valve chamber 88 effects a reduction in brake pipe pressure, and this reduction is effective in the piston chamber of the triple valve devices (not shown) on cars equipped with pneumatically controlled brake equipments. With each electropneumatic brake equipment in a train thus operating to reduce brake pipe pressure, it will be seen that if the number of such equipments is sufficiently in excess of the number of pneumatically controlled brake equipments in the train, brake pipe pressure will be reduced at a greater rate than fluid under pressure can back-flow from the auxiliary reservoir through the feed groove into the piston chamber of the triple valve devices of the pneumatically controlled brake equipments, and when the differential thus established on the triple valve pistons exceeds the amount required to overcome the friction of said pistons, said triple valve devices will operate in the usual manner to effect an application of the brakes. It is obvious that to electrically control the application of the brakes on a train made up of mixed brake equipments, that is, a train having some cars equipped with electropneumatic brake equipments and other cars equipped with pneumatically controlled brake equipments, there must be a sufficient number of electropneumatic brake equipments in the train to effect a brake pipe reduction such that a sufficient differential pressure is created on the triple valve pistons to cause operation of the triple valve devices to apply the brakes.

It will be noted from Fig. 8 that when the brake switch device is in electric service position, communication is established from the rotary valve chamber 38 to passage and pipe 55 through a port 162 in the rotary valve 53, which permits fluid supplied from the reducing valve device 58 to chamber 38 to flow therefrom to the application piston chamber 78 of the distributing valve device through the pipe 55, passage 125 in the distributing valve device 3, cavity 124 in the main slide valve 74, and passages 123 and 163. Fluid supplied to pasage 125 also flows through passage 134 to the application chamber 133.

The pressure of fluid supplied to the application piston chamber 78 causes the application piston 77 to shift the slide valves 79 and 81 toward the right hand, the initial movement causing the slide valve 81 to lap the atmospheric passage 135 and further movement causing port 158 in slide valve 79 to register with opening 160 in the seat, which permits fluid at main reservoir pressure to flow from chamber 80 to chamber 82 and from thence through passage and pipe 137 to the brake cylinder 4. The rate at which fluid under pressure is thus supplied to the application piston chamber 78 is such that the degree of brake application on the locomotive will be substantially the same as on cars having the brake application controlled electrically in the manner hereinbefore described.

When the pressure of fluid supplied to valve chamber 80 of the distributing valve device, and consequently to the brake cylinder 4 and through passage 161 to chamber 166 at the right hand side of the application piston 77, builds up to a degree slightly exceeding the pressure of fluid supplied to the application piston chamber 78, the application piston 77 is shifted toward the left hand. This movement of the piston 77 shifts the application slide valve 79 until port 158 is lapped, so as to prevent further flow of fluid to the brake cylinder.

The hereinbefore mentioned reduction in brake pipe pressure effected by the flow of fluid under pressure from the piston chamber 83 of the triple valve device 10 into the auxiliary reservoir 11 is also effective in the piston chamber 72 of the distributing valve device 3 through passage and pipe 73. When the pressure in piston chamber 72 is thus reduced below the pressure in valve chamber 76, the equalizing piston 71 and slide valves 74 and 75 are shifted to the usual service position, in which fluid under pressure is permitted to flow from valve chamber 76 and connected pressure chamber 122 through the service port 156 in slide valve 74 and passages 123 and 163, and from passage 123 through cavity 157 and passage 134 to the application chamber 133. The pressure of fluid thus applied to the application piston chamber 78 increases the pressure over that supplied to said chamber through the brake switch device, as above described, and consequently increases the degree of brake application on the locomotive. If the degree of brake application thus had on the locomotive should be greater than that desired, the pressure in the brake cylinder 4 may be reduced by moving the independent brake valve device 2 to release position, in which position the application piston chamber 78 is open to the atmosphere through passage and pipe 163, cavity 164 in the rotary valve 63 of the independent brake valve device 2 and the atmospheric passage 165, as indicated in Fig. 10.

The venting of fluid under pressure from the application piston chamber 78 permits brake cylinder pressure in chamber 166 to shift the piston 78 and slide valves 79 and 81 toward the left hand to release position in which fluid under pressure is vented from the brake cylinder 4 through pipe and passage 137, release valve chamber 82, port 171 in the exhaust slide valve 81, and atmospheric passage 135.

When the pressure in the locomotive brake cylinder 4 has been thus reduced to the desired degree, the independent brake valve device 2 is returned to running position in which the pipe 163 is lapped by the rotary valve 68, thereby cutting off further venting of fluid under pressure from the chamber 79. When the pressure in valve chamber 82 and the brake cylinder 4 has been reduced in the above described manner to a degree less than the pressure retained in the piston chamber 78, the application piston 77 and slide valves 79 and 81 are shifted toward the right hand to lap position in which passage 135 is lapped by the exhaust slide valve 81, thereby cutting off further reduction of brake cylinder pressure.

With the equalizing slide valves 74 and 75 in service position, the application piston chamber 78 is connected to the safety valve device 175 through passages 163 and 123, ports 177 and 182 in the slide valve 74, cavity 183 in the slide valve 75, and passage 178, so as to prevent the build-up of excessive pressure in the application piston chamber, and consequently in the brake cylinder 4.

When the brake switch device 16 is turned from electric service position to electric lap position for the purpose of limiting the degree of brake application, as hereinbefore described, the flow of fluid under pressure from the piston chamber 83 of the triple valve device 10, and consequently from the brake pipe, through the feed groove 137 into the valve chamber 88 and auxiliary reservoir 11 will continue until brake pipe pressure equalizes with auxiliary reservoir pressure. This reduction in brake pipe pressure being effective in the piston chamber 72 of the distributing valve device 3, fluid will continue to flow from the valve chamber 76 and pressure chamber 122 to the application piston chamber 78 and application chamber 133, as above described, until the pressure in the valve chamber 76 is reduced to a degree less than the reduced brake pipe pressure in piston chamber 72. The piston 71 and auxiliary slide valve 75 are thereupon shifted toward the left hand to lap position, in which the movement of said piston is stopped by engagement with the main slide valve 74. In lap position, the service port 156 is lapped by the auxiliary slide valve 75 so as to prevent further flow of fluid under pressure to the application piston chamber 78.

It will be noted from Fig. 8 that when the brake switch device is in electric service position, communication is established from the rotary valve chamber 38 of said device to passage and pipe 54 through a port 162 in the rotary valve 53. Fluid supplied to chamber 38 by the reducing valve device 58 is thus supplied to the release pipe 54. With the independent brake valve device 2 in running position, as shown in Fig. 1, fluid under pressure supplied to pipe 54 flows therefrom through passage 127 in said device, cavity 128 in the rotary valve 68, passage and pipe 129, and passage 130 in the automatic brake valve device 15 to the seat of the rotary valve 19. The pipes 54 and 129 are thus charged with fluid at substantially the same pressure as the pressure of fluid obtained in pipe 55 and in the application piston chamber 78 as supplied through the brake switch device in the manner hereinbefore described, so that when the electric brake switch device is turned to electric lap position or to holding position, in which positions passage 54 is connected to passage 55 through the cavity 126 in the rotary valve 53, fluid under pressure will not flow from the pipe 55 and application piston chamber 78 into pipes 54 and 129 and thus effect a partial undesired release of the locomotive brakes.

To effect a release of the brakes after an electric application, the handle 41 of the brake switch device 16 may first be turned to release position and then to running position, and due to the interlocking arrangement between the handle 41 and the handle 20 of the automatic brake valve device hereinbefore described, the handle 20 is moved concurrently with the handle 41 first to release position and then to running position.

In release position of the brake switch device 16, the contact 43 is out of engagement with contacts 44, 45 and 46, so that the release magnet 100 becomes deenergized and the application magnet 89 remains deenergized. With the magnet 100 deenergized, the pressure of the spring 143 of the magnet valve device 14 causes the valve 139 to be seated, closing communication from the valve chamber 141, and thereby the auxiliary reservoir, to the chamber 159 in the release valve device 145, and causes the valve 138 to be unseated. With the valve 138 unseated, fluid under pressure in the chamber 150 exhausts to the atmosphere through passage 146, chamber 144 in the magnet valve device 14, past the unseated valve 138, and through valve chamber 140 and passage 142.

With the pressure in chamber 144 thus removed from the upper side of the diaphragm valve 147, said valve will be flexed upwardly by the pressure of fluid in the passage 155 and acting on the inner seated area of the release valve 145. With the release valve thus unseated, fluid under pressure flows from the brake cylinder 12 to the atmosphere through passage 108, cavity 153 in the main slide valve 86 of the triple valve device 10, passage 154, pipe and passage 155, valve chamber 151 in the release valve device 145 and the atmospheric passage 152.

In release position of the automatic brake valve device 15, fluid at main reservoir pressure is supplied to the brake pipe, in the usual manner, from the rotary valve chamber 18 in said device through a port 170 in the rotary valve 19 and thence through passage 118. The increase in brake pipe pressure causes the triple valve devices on cars not equipped with an electro-pneumatic brake equipment to operate in the usual manner to release the brakes on those cars and to recharge the associated auxiliary reservoirs. The auxiliary reservoirs associated with the electro-pneumatic brake equipments are recharged in the manner described in connection with the initial charging of the equipment.

The increase in brake pipe pressure effected through the automatic brake valve device 15 when in release position shifts the equalizing piston 71 and slide valves 74 and 75 in the distributing valve device to release position as hereinbefore described. In release position of the brake switch device, the passage 55 is lapped by the rotary valve 53, so that in this position, the locomotive brakes are held applied while the brakes on the cars in the train are being released by an increase in brake pipe pressure.

When the brake switch device, and thereby the automatic brake valve device, is turned to running position, the brake pipe is charged through the rotary valve 19 in the brake valve device in the manner described in connection with the initial charging of the equipment. In running position of the brake switch device, the cavity 126 in the rotary valve 53 establishes communication between passages 54 and 55. With this communication established, fluid under pressure is vented from the application piston chamber 78 to the atmosphere through passages 163 and 123, cavity 124 in the slide valve 74, passage 125, pipe and passage 55, cavity 126 in the rotary valve 53, passage and pipe 54, passage 127 in the independent brake valve device 2, cavity 128 in the rotary valve 68, passage and pipe 129, passage 130 in the automatic brake valve device 15, cavity 131 in the rotary valve 19, and the atmospheric passage 132, thereby effecting a release of locomotive brakes. The application chamber 133 being connected through passage 134 to cavity 124 in slide valve 74, through which fluid under pressure is vented from the application piston chamber 78, the chamber 133 is also vented.

After a service application of the brake is effected electrically, if it is desired to release the brakes on the cars only while recharging to feed valve pressure, the brake switch device is turned from electric lap position to electric release position and this movement of said device automatically positions the automatic brake valve device 15 in holding position, due to the interlocking arrangement of the respective handles hereinbefore described.

In electric release position of the brake switch device, the release magnet 100 is deenergized and fluid under pressure is thereby vented from the brake cylinder 12 to the atmosphere in the manner described hereinbefore. The brake valve device being in holding position, fluid at feed valve pressure is supplied from passage 112 through cavity 113 in the rotary valve 19 to the passage 118 leading to the brake pipe 6. Fluid under pressure thus supplied to the brake pipe causes the triple valve devices on cars not equipped with an electro-pneumatic brake equipment to operate to release the brakes on those cars.

The increase in brake pipe pressure effected in holding position of the brake valve device also causes the equalizing piston 71 of the distributing valve device 3 and the slide valves 74 and 75 to move to their release positions.

The locomotive brake is held applied in holding position of the brake valve device 15 because the passage 172, which leads through pipe and passage 163 to the application piston chamber 78 in the distributing valve device 3, is lapped by the rotary valve 19 of the brake valve device.

It will be noted from Fig. 8 that in the movement of the brake valve device from electric lap position to holding position, the cavity 113 in the rotary valve 19 establishes communication from passage 112 to passage 118 slightly in advance of the opening of the circuit from contact 44 to contact 45 by the contact 43 in the brake switch device. Thus, fluid at feed valve pressure is supplied to the brake pipe in advance of the opening of the release magnet circuit, for a purpose which will now be explained.

As hereinbefore explained, in the automatic brake valve device there is a zone adjacent to the lap position notch, toward the holding position notch, in which the brake valve device is lapped, and electric lap position is disposed within this zone. After a predetermined movement from electric lap position toward electric release position, or holding position of the brake valve device, the feed valve passage 112 is open to the brake pipe passage 118 through the cavity 113 in the rotary valve 19, this opening being restricted at first and becoming larger as the movement toward holding position continues. Now, if the release magnet circuit were arranged so as to be opened during this movement and before the feed valve passage is opened to the brake pipe passage, then it would be possible for the operator, when desiring to release the car brakes while holding the locomotive brakes applied, to unintentionally use a position in which the electro-pneumatic brake equipments would be released and the feed valve passage in the brake valve device remain lapped. This, of course, would be an undesirable condition because, with the supply of fluid under pressure to the brake pipe thus cut off, leakage from the brake pipe would deplete the pressure therein and, furthermore, the triple valve devices on the cars not equipped with an electro-pneumatic brake equipment would remain applied. To obviate these difficulties, the contact 43 in the brake switch device is arranged to maintain the release magnet circuit energized until the cavity 113 opens communication from the feed valve passage 112 to the brake pipe passage 118.

If it is desired to effect an emergency application of the brakes, the handle 20 of the brake valve device is moved to emergency position and since the arm 34 remains in contact with the face 61 of the handle 41 of the brake switch device, the handle 41 will be moved a corresponding distance by the handle 20. With the brake switch device thus turned to emergency position, the contact 43 engages the fixed contacts 44, 45 and 46, as shown in Fig. 8, so that the train wires are energized and the electro-pneumatic brake equipments are caused to operate to apply the brakes in the same manner as hereinbefore described in connection with an electric service application of the brakes. With the brake valve device in emergency position, fluid under pressure is suddenly vented from the brake pipe through passage 118, cavity 174 in the rotary valve 19 and the atmospheric passage 132, with the result that the triple valve devices on cars not equipped with an electro-pneumatic brake equipment are caused to operate to effect an emergency application of the brakes on said cars in the usual well known manner. It is obvious that in the event of a failure of the electric equipment when the brake valve device and the brake switch device are thus moved to emergency position, the rapid venting of fluid from the brake pipe through the brake valve device, being effective in the piston chamber 83 in the triple valve device 10, will cause said device to operate to effect an emergency application of the brakes.

The above mentioned sudden venting of fluid from the brake pipe is effective in the equalizing piston chamber 72 in the distributing valve device 3, and the equalizing piston 71 and slide valves 74 and 75 are therefore moved to emergency position in which fluid is supplied from the pressure chamber 122 to the application piston chamber 78 directly from the valve chamber 76, past the end of the slide valve 74 to passage 123 and thence through passage 163. Passage 134 from the application chamber 133 is lapped by the slide valve 74, so that fluid pressure equalizes from the pressure chamber 122 only into the application piston chamber 78, thus producing a higher pressure than is obtained in effecting a service application of the brakes. The application portion of the distributing valve device is then operated to supply fluid under pressure to the brake cylinder 4 as hereinbefore described. The application piston chamber 78 is also connected to the safety valve device 175 through passages 163 and 123, the restricted passage 176 in the equalizing slide valve 74, port 177 in said slide valve, and passage 178.

In emergency position of the brake valve device 15, fluid at feed valve pressure is supplied from the rotary valve chamber 18 of said device to the application cylinder pipe 163 through the restricted port 179 in the rotary valve 19. Fluid under pressure thus supplied to the application cylinder pipe flows thence through passage 163 in the distributing valve device to the application piston chamber 78. This additional supply of fluid under pressure to the application piston chamber 78 tends to increase the equalized pressure of the pressure chamber 122 and the application piston chamber 78. If the pressure of the fluid in the application piston chamber exceeds the pressure adjustment of the safety valve device 175, said device will operate to reduce said pressure until a balance is established between the rate at which fluid is supplied to said chamber through the brake valve device and vented from said chamber through the safety valve device, after which the balance will be maintained as long as the supply is continued.

In order to effect a release of the brakes after an emergency application, the handle 41 of the brake switch device 16 may be turned to running position and due to the engagement of the face 61 of the handle 41 with the arm 34, the handle 20 of the brake valve device will also be moved to running position, or if the handle 41 is first turned to release position and then to running position, said engagement will cause the handle 20 to be moved to release position and then, due to the engagement of the arm 34 within the recess 59, the handle 20 will be moved to running position, concurrently with the corresponding movement of the handle 41. The equipment is then recharged and the brakes released in the same manner as hereinbefore described.

If it is desired to apply the locomotive brakes independently of the train brakes when the automatic brake valve device is in running position and the equalizing portion of the distributing valve device is in release position, as shown in Fig. 1, the independent brake valve device 2 may be turned to either quick application position or slow application position according to how fast it is desired to apply the locomotive brakes.

In quick application position of the independent brake valve device, fluid at the pressure supplied by the reducing valve device 58 to the rotary valve chamber 69 flows therefrom through a port 180 to passage 163, as indicated in Fig. 10, and from thence through the application cylinder pipe 162 to the distributing valve device, then through passage 163 in the distributing valve device to the application piston chamber 78. Fluid under pressure thus supplied to the application piston chamber causes the application portion of the distributing valve device to operate to supply fluid under pressure to the brake cylinder 4 in the same manner as hereinbefore described and at a rate governed by the rate at which fluid under pressure is supplied to the application piston chamber 78. Fluid under pressure supplied to passage 163 in the distributing valve device also flows through passage 123, cavity 124 in the slide valve 74 and passage 134 to the application chamber 133, but the supplying of fluid to said chamber at this time is merely incidental.

If it is desired to limit the degree of pressure obtained in effecting an application of the locomotive brakes to less than the pressure supplied by the reducing valve device 58, then when the desired degree of application of brakes is obtained on the locomotive, the independent brake valve device is turned to lap position, in which position passage 163 in said device is lapped so as to prevent further flow of fluid under pressure to the distributing valve device.

In the slow application position of the independent brake valve device, the locomotive brakes are applied in the same manner as in the quick application position except at a slower rate, the supply of fluid at reducing valve pressure to the application cylinder pipe 163 occurring through a restricted port 181 in the rotary valve 68, as indicated in Fig. 10.

When it is desired to effect a release of the locomotive brakes by operation of the independent brake valve device, said brake valve device may be turned to running position, in which position, with the automatic brake valve device in running position and the equalizing slide valve 74 of the distributing valve device in release position, fluid under pressure is vented from the application piston chamber 78 and application chamber 133 to the atmosphere through the brake switch device and both of the brake valve devices, in the same manner as when releasing the locomotive brakes by operation of the automatic brake valve device after a service application. This venting of fluid under pressure from the application piston chamber 78 permits brake cylinder pressure acting in chambers 82 and 166 to move the application piston 77 to release position for venting fluid under pressure from the brake cylinder 4 in the same manner as hereinbefore described.

In the event of failure of the electric equipment, or if for any other reason it should be so desired, the operator by the use of the automatic brake valve deivce 15 may so vary brake pipe pressure as to cause the triple valve devices 10 of the electro-pneumatic brake equipments and the triple valve devices on cars not provided with an electro-pneumatic brake equipment to operate and effect the application and release of the brakes in the usual manner. In this case, the handle 41 of the brake switch device 16 is first turned to and left in electric brake cut-out position, in which position the contact 43 in said device is out of engagement with the contacts 44, 45 and 46, thereby maintaining the train wires 7, 8 and 9 deenergized. In this position of the brake switch device, passages 54 and 55 are connected by a cavity 173 in the rotary valve 53, as indicated in Fig. 10, so that the locomotive brakes may be released through both brake valve devices in the manner hereinbefore described.

The above mentioned movement of the handle 41 for cutting out the electric brake control causes the handle 20 of the automatic brake valve device to be positioned in electric lap position, due to the interlocking arrangement between said handles. The handle 20, being then free from the handle 41 may thereafter be operated in the usual manner for controlling the locomotive and train brakes.

It will be apparent from the foregoing description that there has been provided an improved combined automatic brake valve device and a brake switch device for controlling the car brakes either pneumatically or electrically and the locomotive brakes pneumatically at all times, said devices being so interlocked that when the brakes are being controlled electrically and the brake switch device is turned to the electric service position, the automatic brake valve device is automatically lapped for cutting off the supply of fluid from the feed valve to the brake pipe, and when the brake switch device is moved to release or running position for releasing the brakes and recharging the brake system, the automatic brake valve device is automatically moved to release or running position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a brake pipe and a brake valve device operative to supply fluid under pressure to said brake pipe and to pneumatically control the brakes on the train by varying the pressure of fluid in said brake pipe, of electrically controlled means operative to control the brakes on the train independently of variations in brake pipe pressure, manually controlled means for controlling the operation of said electrically controlled means, and means operative upon operation of said manually controlled means to effect an application of the brakes, to effect operation of said brake valve device to cut off the supply of fluid under pressure to said brake pipe.

2. The combination with a brake pipe and a brake valve device operative to supply fluid under pressure to said brake pipe and to pneumatically control the brakes on the train by varying the pressure of fluid in said brake pipe, of electrically controlled means operative to control the brakes on the train independently of variations in brake pipe pressure, manually controlled means for controlling the operation of said electrically controlled means, and means operative, upon operation of said manually controlled means to effect an application of the brakes, to effect operation of said brake valve device to cut off the supply of fluid under pressure to said brake pipe, said means being also operative, upon operation of said manually controlled means to effect a release of the brakes, to effect operation of said brake valve device to supply fluid under pressure to said brake pipe.

3. The combination with a brake pipe and a brake valve device operative to pneumatically control the brakes on a train by varying the pressure of fluid in said brake pipe, said brake valve device having a position for supplying fluid under pressure to said brake pipe and a lap position for cutting off said supply, of a brake switch device operative to electrically control the brakes on the train and having an application position for effecting an application of the brakes, interlocking means operatively connecting said brake switch device to said brake valve device between said positions of said brake valve device, and means operative to render said interlocking means ineffective when lap position is reached, so that further movement of said brake switch device to said application position is independent of said brake valve device.

4. The combination with a brake pipe and a brake valve device operative to pneumatically control the brakes on a train by varying the pressure in said brake pipe, said brake valve device having a release position for supplying fluid under pressure to said brake pipe and a lap position for cutting off said supply, of a brake switch device operative to electrically control the brakes on the train and having a release position and an application position, interlocking means operatively connecting said brake valve device and said brake switch device within a zone of movement defined by the first mentioned release position and said lap position whereby the brake valve device is moved through said zone upon movement of said brake switch device from the second mentioned release position to a predetermined position in a direction toward application position, means for causing said interlocking means to become ineffective in said lap position so that further movement of said brake switch device to said application position is independent of said brake valve device, and means for causing said interlock means to become effective when the brake switch device is returned from said application position to said predetermined position.

5. The combination with a brake pipe, a brake valve device operative to pneumatically control the brakes on a train by varying the pressure in said brake pipe, said brake valve having a release position for supplying fluid under pressure to said brake pipe and a lap position for cutting off said supply, and a handle for operating said valve device, of a brake switch device operative to electrically control the brakes on the train and having a release position and an application position, a handle for operating said brake switch device, driving means associated with the second mentioned handle and adapted to engage the first mentioned handle, means for causing said driving means to engage the first mentioned handle in said release positions and during movement of the second mentioned handle from the second mentioned release position to a predetermined position intermediate the second mentioned release position and said application position whereby the first mentioned handle is moved to said lap position, means for causing said driving means to become disengaged from the first mentioned handle in said predetermined position, other driving means associated with the second mentioned handle and adapted to engage the first mentioned handle, and means for causing the second mentioned driving means to engage the first mentioned handle upon movement of the second mentioned handle through said predetermined position toward the second mentioned release position, the last mentioned means also acting to maintain said engagement during movement of the second mentioned handle from said predetermined position to the second mentioned release position.

6. The combination with a brake pipe and a brake valve device operative to pneumatically control the brakes on a train by varying the pressure of fluid in said brake pipe, said brake valve device having a release position for supplying fluid under pressure to said brake pipe and a lap position for cutting off said supply, of a brake switch device having a release position, an application position and another position intermediate the second mentioned release and said application position, means operative upon movement of said brake switch device from the second mentioned release position to said other position to effect operation of said brake valve device from the first mentioned release position to said lap position, means for rendering the first mentioned means ineffective in said other position so that further movement of said brake switch device toward said application position is independent of said brake valve device, and means operative upon movement of said brake switch device through said other position from said application position to the second mentioned release position to effect operation of said brake valve device from said lap position to the first mentioned release position.

7. The combination with a brake pipe, a brake valve device operative to pneumatically control the brakes on a train by varying the pressure of fluid in said pipe and having certain operating positions, a quadrant for defining said positions, said brake valve device having a release position for supplying fluid under pressure to said brake pipe, a service position for effecting a reduction in brake pipe pressure for applying the brakes and a lap position intermediate said release position and said service position for cutting off said supply, and a handle for operating said brake valve device, of a brake switch device operative to electrically control the brakes on the train and having a release position and an application position, a handle for operating said brake switch device, and means cooperatively associated with said handles and said quadrant for effecting movement of said brake valve device from the first mentioned release position only to said lap position upon movement of said brake switch device to said application position and for effecting movement of said brake valve device from said lap position to the first mentioned release position upon movement of said brake switch device from said application position to the second mentioned release position.

8. The combination with a brake pipe and a brake valve device operative to pneumatically control the brakes on a train by varying the pressure of fluid in said pipe and having a position for supplying fluid under pressure to said brake pipe and a lap position for cutting off said supply, of a brake switch device operative to electrically control the brakes on the train and having a release position, an application position and a cut-out position in which the electric control of the brake is rendered inoperative, means operatively connecting said brake valve device and said brake switch device for effecting movement of said brake valve device from said fluid supplying position to said lap position upon movement of said brake switch device from said release position to said application position, and means for rendering said connecting means ineffective when lap position is reached, so that further movement of said brake switch device to said application position and to said cut-out position is independent of said brake valve device and so that said brake valve device may be operated independently of said brake switch device when said brake switch device is in said cut-out position.

9. The combination with a brake pipe and a brake valve device operative to pneumatically control the brakes on a train by varying the pressure of fluid in said pipe and having a release position in which communication is opened for supplying fluid under pressure to said brake pipe and a lap position in which said communication is closed, of a brake switch device operative to electrically control the brakes on the train and having a release position for releasing the brakes and an application position for applying the brakes, and means operative to move said brake valve device out of the first mentioned release position to said lap position upon movement of said brake switch device from the second mentioned release position to said application position, said means being also operative, upon movement of said brake switch device from said application position toward the second mentioned release position, to move said brake valve device to the first mentioned release position before said brake switch device has completed the movement to the second mentioned release position.

10. In a fluid pressure brake for a locomotive and cars of a train, the combination with a brake cylinder on the locomotive, of an application and release pipe, a release pipe, a valve device operated by an increase in fluid pressure in said application and release pipe for effecting the supply of fluid under pressure to said brake cylinder and operated by a reduction in fluid pressure in said application and release pipe for effecting the release of fluid under pressure from said brake cylinder, a brake switch device operative to electrically control the brakes on the cars and having an application position for effecting an application of the brakes and for supplying fluid under pressure to said pipes and also having a release zone for effecting a release of the brakes and for establishing communication between said pipes, and a brake valve device for controlling a passage through which fluid under pressure is vented from said release pipe, said brake valve device being operative, upon movement of said brake switch device to said application position, to a position for closing said passage and operative, upon movement of said brake switch device out of said application position to the adjacent limit of said zone, to maintain said passage closed, said brake valve device being also operative, upon further movement of said brake switch device to a position within said zone, to open said passage.

11. In a fluid pressure brake for a locomotive and cars of a train, the combination with a brake cylinder on the locomotive and a brake pipe, of an application and release pipe, a release pipe, a valve device operated by an increase in fluid pressure in said application and release pipe for effecting the supply of fluid under pressure to said brake cylinder and operated by a reduction in fluid pressure in said application and release pipe for effecting the release of fluid under pressure from said brake cylinder, a brake switch device operative to electrically control the brakes on the cars and having an application position for effecting an application of the brakes and for supplying fluid under pressure to said pipes and also having a release zone for effecting a release of the brakes and for establishing communication between said pipes, a brake valve device for controlling the supply of fluid under pressure to said brake pipe and for controlling a passage through which fluid under pressure is vented from said release pipe, and means operative, upon the operation of said brake switch device to said application position, to effect operation of said brake valve device to cut off the supply of fluid under pressure to said brake pipe and to close said passage and operative, upon movement of said brake switch device out of said application position to the adjacent limit of said zone to effect the operation of said brake valve device to supply fluid under pressure to said brake pipe and to maintain said passage closed, said means being also operative, upon further movement of said brake switch device to a position within said zone, to supply fluid under pressure to said brake pipe and to open said passage.

12. In a fluid pressure brake for a locomotive and cars of a train, the combination with a brake cylinder on the locomotive, of a pipe, a valve device operated by an increase in fluid pressure in said pipe for effecting the supply of fluid under pressure to said brake cylinder and operated by a reduction in fluid pressure in said pipe for effecting the release of fluid under pressure from said brake cylinder, a brake switch device operative to electrically control the brakes on the cars and having an application position for effecting an application of the brakes and for supplying fluid under pressure to said pipe and also having a release zone for effecting a release of the brakes and for cutting off the supply of fluid under pressure to said pipe, a brake valve device for controlling a passage through which fluid under pressure is vented from said pipe, and means operative, upon the operation of said brake switch device to said application position, to effect operation of said brake valve device to close said passage and operative, upon movement of said brake switch device out of said application position to the adjacent limit of said zone, to maintain said passage closed, said means being also operative, upon further movement of said brake switch device to a position within said zone, to open said passage.

13. In a fluid pressure brake for a locomotive and cars of a train, the combination with a brake cylinder on the locomotive and an application and release pipe, of a valve device operated by an increase in fluid pressure in said pipe for effecting a supply of fluid under pressure to said brake cylinder, and manually operated control means operative to electrically control the brakes on said cars and operative upon movement of said brake switch device to effect an application of the brakes on said cars to supply fluid under pressure to said pipe.

14. In a fluid pressure brake for a locomotive and cars of a train, the combination with a brake cylinder on the locomotive, of a valve device having an application chamber and operated upon an increase in fluid pressure in said chamber to open a communication through which fluid under pressure is supplied to said brake cylinder and operated upon a reduction in fluid pressure in said chamber to close said communication and open another communication through which fluid under pressure is released from said brake cylinder, a pipe through which fluid under pressure is supplied to and released from said chamber, a brake switch device operative to electrically control the brakes on said cars, and means operative upon movement of said brake switch device to effect an application of the brakes on said cars to supply fluid under pressure to said pipe.

DONALD L. McNEAL.